United States Patent [19]
Abe et al.

[11] Patent Number: 4,853,890
[45] Date of Patent: Aug. 1, 1989

[54] VECTOR PROCESSOR
[75] Inventors: Shigeo Abe, Hitachi; Tadaaki Bandoh, Ibaraki; Kotaro Hirasawa, Hitachi; Jushi Ide, Mito, all of Japan
[73] Assignee: Hitachi, Ltd., Tokyo, Japan
[21] Appl. No.: 485,396
[22] Filed: Apr. 15, 1983
[30] Foreign Application Priority Data
  Apr. 16, 1982 [JP] Japan .................................. 57-62566
[51] Int. Cl.[4] .............................................. G06F 9/00
[52] U.S. Cl. .................................. 364/900; 364/965.4
[58] Field of Search ... 364/200 MS File, 900 MS File, 364/491, 414, 736

[56] References Cited
U.S. PATENT DOCUMENTS

| | | | |
|---|---|---|---|
| 4,041,461 | 8/1977 | Kratz et al. | 364/200 |
| 4,075,704 | 2/1978 | O'Leary | 364/200 |
| 4,172,287 | 10/1978 | Kawabe et al. | 364/736 |
| 4,179,734 | 12/1979 | O'Leary | 364/200 |
| 4,229,790 | 10/1980 | Gilliland et al. | 364/200 |
| 4,247,892 | 1/1981 | Lawrence | 364/200 |
| 4,298,936 | 11/1981 | Shapiro | 364/200 |
| 4,400,778 | 8/1983 | Vivian et al. | 364/200 |
| 4,490,807 | 12/1984 | Chevillat et al. | 364/736 |

OTHER PUBLICATIONS

G. L. Kratz et al., "A Microprogrammed Approach to Signal Processing", IEEE Transactions on Computers, vol. C-23, No. 8, Aug. 1974, pp. 808-817.
E. S. Davidson et al., "Effective Control for Pipelined Computers", Proceedings CompCon Spring 1975, Feb. 1975, pp. 181-183.
P. M. Kogge, "The Microprogramming of Pipelined Processors," IBM Federal Systems Division, Owego, N.Y. 13827.
S. F. Anderson et al., "The IBM System/360 Model 91: Floating-Point Executin Unit," IBM Journal of Research and Development, vol. 11, No. 1, Jan. 1967, pp. 34-53.
M. Morris Mano, "Computer System Architecture", pp. 274-283, Prentice-Hall, Inc., 1982.
"Array Processors" by Peter Alexander Published in Digital Design, Dec. 1978, pp. 104-107.
Kozdrowicki, Edward, et al., "Second Generation Supercomputers", Computer, IEEE, Nov. 1980, pp. 71-83.
Lincoln, Neil, "Technology and Design Tradeoffs in the Creation of a Modern Supercomputer", IEEE Transactions on Computers, vol. C-31, No. 5, May 1982, pp. 349-362.

Primary Examiner—Gareth D. Shaw
Assistant Examiner—John G. Mills
Attorney, Agent, or Firm—Antonelli, Terry & Wands

[57] ABSTRACT

In a vector processor including pipeline processors and means for synchronously controlling each component, there is provided an FIFO memory for temporarily storing the output of each pipeline processor and for outputting the stored data, in the order of storing, to at least one of the pipeline processors. Since intermediate result of operation is temporarily stored in the FIFO memory, a simple microprogram can be used and thus the capacity of the memory for microprogram can be reduced even if the successive intermediate results for calculation of vector elements are overlapped within the loop of the microprogram.

10 Claims, 6 Drawing Sheets

VECTOR PROCESSOR

BACKGROUND OF THE INVENTION

1. Field of the Invention

This invention relates to vector processors, and more particularly to a vector processor which enables easy microprogramming for vector processing.

2. Description of the Prior Art

Vector processing, or repetition of the sametype operation on successive data elements as represented by the calculation of a matrix, Fourier transformation and so on, can be performed at high speed by, for example, a known pipelined vector processor. In this pipeline processor, there are provided plural stages for arithmetic processing, and while one data element is processed through the stages in order, another data element is also processed through the stages, following the former data element. The U.S. Pat. No. 4,075,704 to O'Leary, for example, discloses a vector processor including a pipeline adder and a pipeline multiplier. The pipeline adder includes 2 stages, each performing part of an addition in one clock cycle, and the pipeline multiplier includes 3 stages, each performing part of multiplication in one clock cycle.

When such pipeline processor is used to perform a vector processing, the arithmetic operations on different data performed in an overlapped manner (multiple parallism) to the extent as possible, and the shortest operation loop is used, so that arithmetic operations can be performed at high speed. Such arithmetic operations will be described with reference to, for example, a simple vector processing written in the following FORTRAN language:

$$\left.\begin{array}{l} DO\ 100\ I = 1, N \\ F(I) = X(I) + C \\ Y(I) = A*F(I) + F(I) \end{array}\right\} \quad (1)$$

100 CONTINUE

The above example shows a very simplified function vector processing such as for a sine function.

The program (1) is a combination of additionmultiplication-addition, and becomes a 7-stage processing if it uses a 2-stage adder and a 3-stage multiplier. One vector component is calculated at 8 stages by adding one output stage thereto. In a pipeline arithmetic operation, it is possible to the start operation for a new data element (index I) at each clock cycle.

However, it is necessary to temporarily store an intermediate result F(I) in program (1). Before the read-out of an intermediate result for index I which has been once stored, the next intermediate result for index (I+1) may be required to be stored. In program (1), the result of two-stage addition for index (I+1) is obtained during the period of three-stage multiplication for index I. Thus, it is necessary to temporarily store these intermediate results at two places. This results in the necessity for distinguishing the addresses of the memory for the odd-numbered index and even-numbered index. Thus, a loop must be formed for a group of operations on the (I+1) and (I+2) data elements, as a unit.

For this reason, in the conventional processor, the number of steps for repetitive loop of the microprogram becomes large for discrimination of addresses for temporary storing, and the contents of the steps become complex. This problem may not be so important in a very simple program, but becomes serious in a general function operation and the like because the repetitive loop may include several tens steps or more. In addition, when the number of steps is increased to twice, three times or more, the microprogram itself and the capacity of the control memory for storing the microprogram should be increased correspondingly, which causes a serious problem.

SUMMARY OF THE INVENTION

It is an object of this invention to provide a pipelined vector processor capable of solving the above problems, facilitating microprogramming and reducing the number of microprogram steps.

While an intermediate result of operation is temporarily stored in a register or memory, another intermediate result of the same operation for the next index may also be stored. In this case, the preceding intermediate result is usually read first.

In a vector processor including a pipeline processor, a first-in first-out (FIFO) buffer is employed as hardware to temporarily store an intermediate result, so that even if successive intermediate results are stored in an overlapped manner, it becomes unnecessary to identify each index I.

Other objects, features and advantages of this invention will become apparent from the following description of the embodiments with reference to the accompanying drawings.

DESCRIPTION OF PREFERRED EMBODIMENTS

For better understanding of this invention, the prior art will first be described briefly.

Figure 1:
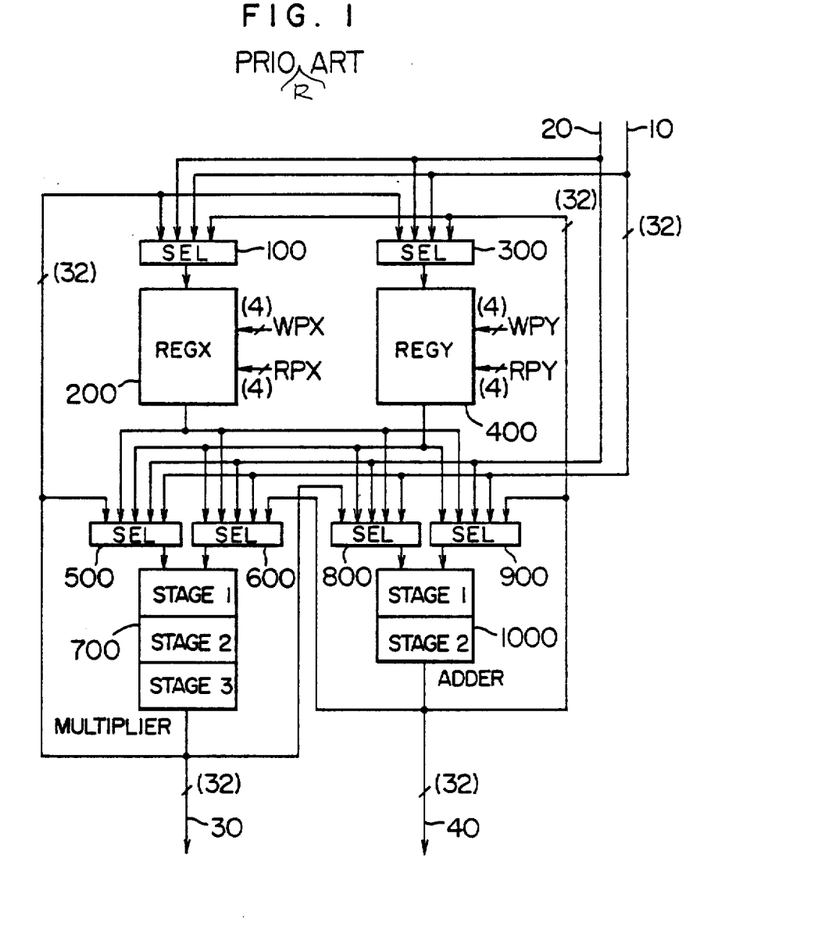
FIG. 1 is a block diagram of a conventional vector processor.

FIG. 1 shows a main part of a conventional vector processor. A pipeline multiplier 700 includes three stages for performing the floating-point multiplication of inputs selected by selectors 500 and 600 in three machine cycles to produce an output FM on a 32-bit bus 30. A pipeline adder 1000 includes two stages for performing the floating-point addition of inputs selected by selectors 800 and 900 in two machine cycles to produce an output FA on a 32-bit bus 40. The multiplied output FM is also fed to the selector 800 and the added output FA is also fed to the selector 600. Also, the outputs FM and FA are fed through selectors 100 and 300 to register files REGX 200 and REGY 400, respectively. The register files 200 and 400 are accessed with read pointers RPX and RPY and write pointers WPX and WPY, respectively, and are capable of reading and writing one block of data in one machine cycle.

Now, let it be considered that the additionmultiplication-addition operation in the above program (1) is performed by this vector processor. The microprogram for executing operation for I=1 is shown in a register transistor language (RTL) in FIG. 2.

Figure 2:
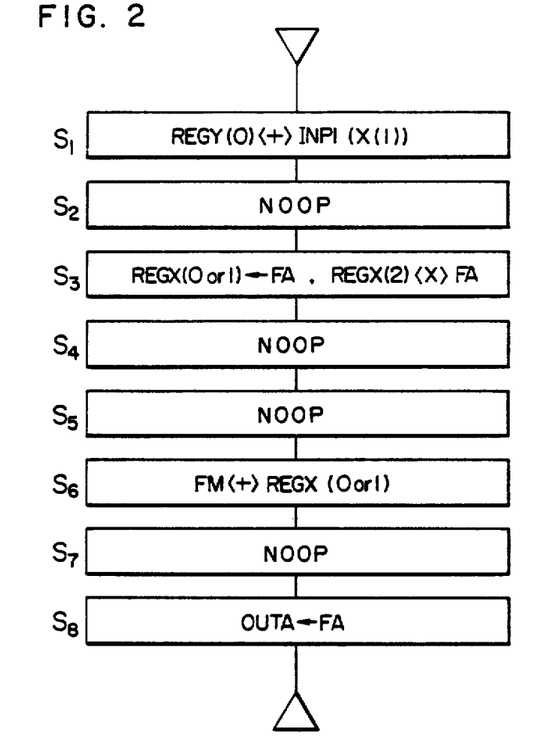
FIG. 2 is a flow chart of a microprogram for the processor of FIG. 1.

In FIG. 2, the first half of the addition of two inputs, REGY(0)=C and INP(1)=X(1) is performed at stage 1 of the adder 1000 (step S1) and the second half thereof follows the first half at stage 2 of the adder 1000 (step S2). The result FA of the addition is stored in the register REGX(0) and also fed to the multiplier 700 in which it is multiplied with another input REGX(2) at stage 1 (step S3), and the multiplication at stages 2 and 3 follow successively (step S4, S5). The result FM of the multiplication is fed to the adder 1000 and added to the result FA of addition temporarily stored in the register REGX(0) at stage 1 (step S6). The addition at stage 2 follows (step S7) and the result FA is outputted (step S8).

Figure 3:
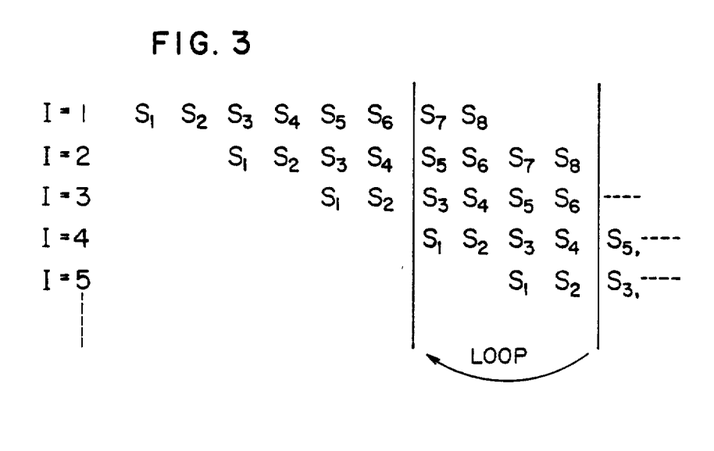
FIG. 3 is an explanatory diagram useful for explaining pipeline processing steps to be executed upon repetition of the program of FIG. 2 for each index in the system of FIG. 1.

As described above, the intermediate result FA is temporarily stored at step S3 and read at step S6, and the adder 1000 is used twice at steps S1, S2 and S6, S7. In the vector arithmetic operations for different indices, for example, I=1, 2, ... N, multiple parallel operations are performed by pipeline processing in order to reduce the operation time. At this time, when the same pipeline processor (e.g. adder 1000) is used twice or more (e.g. twice) during one process, it is impossible to start operation for a new index at each step because of restriction of hardware resources. Therefore, in the above example, the start of operation for a new index should be delayed by 2 steps, as shown in FIG. 3. From FIG. 3 it will be obvious that the steps using the same part of the operation units as steps S1 and S6, and steps S2 and S7 are not doubled simultaneously. It is thus expected to perform an arithmetic operation with a loop consisting of two steps.

However, there is another problem. That is, since the intermediate result of the operation is temporarily stored during the steps S3 to S6, it is necessary to temporarily store two intermediate results when each process on the successive data elements is delayed by two steps. In other words, it is necessary to distinguish the write/read operation of the intermediate result in the process for index I (e.g. S3 (I)) from that for I+1 (e.g. S3(I+1)). Therefore, the repetition loop should include four steps.

Figure 4:
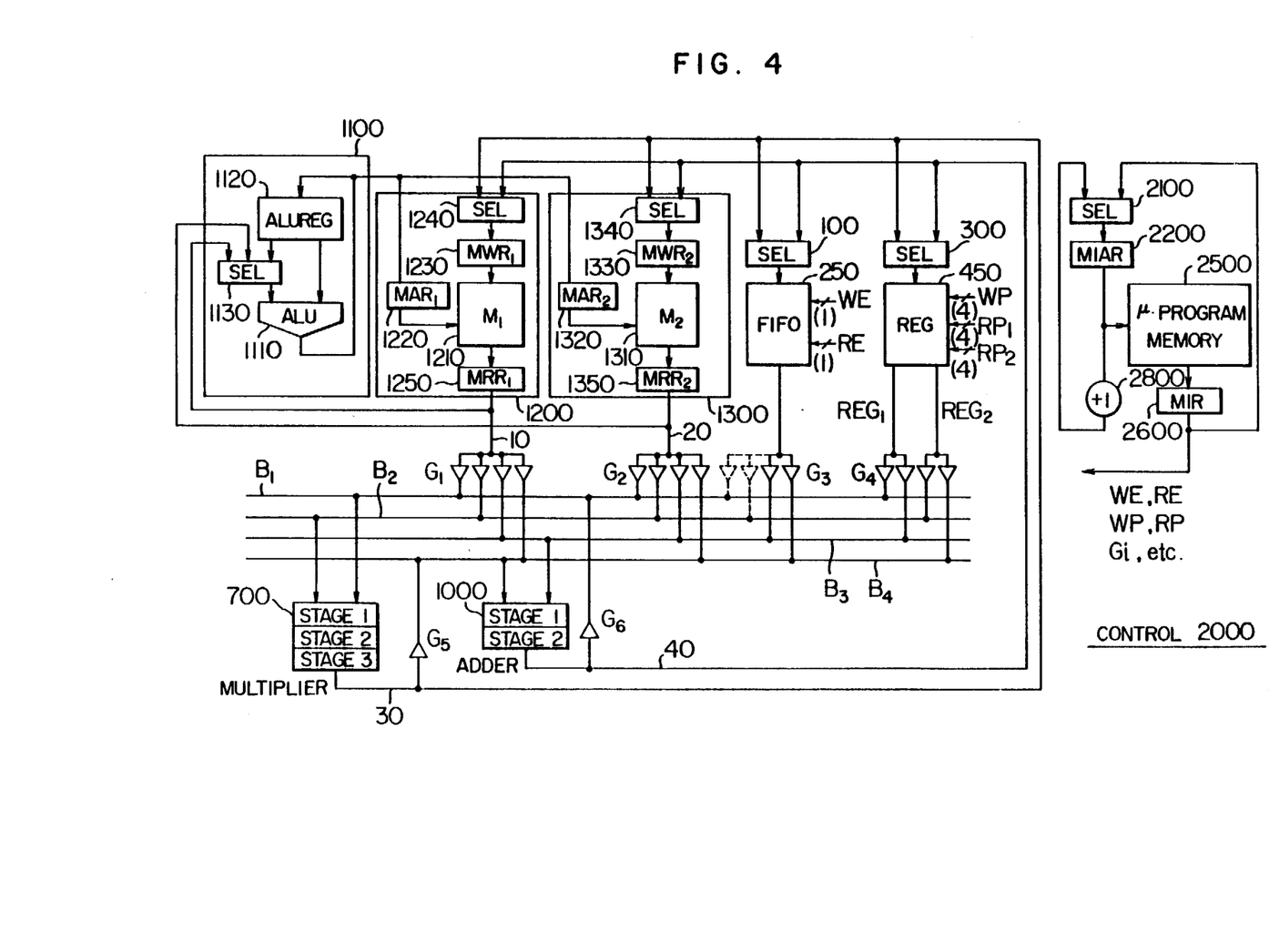
FIG. 4 is a block diagram of a vector processor according to one embodiment of this invention.

FIG. 4 shows a vector processor according to an embodiment of this invention.

The pipeline multiplier 700 and pipeline adder 1000 are similar to those in FIG. 1. The pipeline multiplier 700 performs partial multiplication at each of stages 1 and 2 and addition at stage 3 to obtain a total product. The pipeline adder 1000 carries out adjustment of decimal point positions at stage 1 and addition at stage 2. A register file REG 450 has one input port and two output ports and is controlled to write and read by write pointer WP and read pointers $RP_1$ and $RP_2$. This register file REG 450 corresponds to the two register files REGX 200 and REGY 400 in FIG. 1, but is more advantageous in the point of being capable of performing write/read operation without distinction between registers REGX and REGY. As illustrated, either of two inputs is selected by the selector SEL 300, and two outputs $REG_1$ and $REG_2$ of the register REG 450 are supplied through a gate $G_4$ to one of the buses $B_1$ to $B_4$. Each output can be applied to an input of each pipeline operation unit.

A FIFO memory 250 is supplied with an input selected by the selector SEL 100 and supplies its output via a gate $G_3$ to one of the buses $B_1$ to $B_4$. Since the FIFO 250 first produces the first-inputted information, it does not require an address designation, and is controlled by write signal WE and read signal RE. The gate $G_3$ may be one capable of selectively supplying the FIFO output to only one of the buses $B_3$ and $B_4$. The abovementioned partial arrangement corresponds to the conventional arrangement of FIG. 1.

In FIG. 4, there are also shown an address calculation unit 1100, two memory units 1200 and 1300, and a control unit 2000.

In the address calculation unit 1100, an arithmetic logic unit ALU 1110 is supplied with one output of a register ALUREG 1120 and the output of a selector 1130 and calculates the inputs. The result of the calculation is supplied to the register ALUREG 1120, and memory address registers $MAR_1$ 1220 and $MAR_2$ 1320 of memory units 1200 and 1300. The selector SEL 1130 selects one of the outputs of the memory units 1200 and 1300 and the other output of the register ALUREG 1120.

In each of the memory units 1200 and 1300, data in write register $MWR_1$ 1230 or $MWR_2$ 1330 is written in one machine cycle in memory $M_1$ 1210 or $M_2$ 1310 at an address specified by the $MAR_1$ 1220 or $MAR_2$ 1320, or data in the memory $M_1$ 1210 or $M_2$ 1310 at the designated address is read into the register $MRR_1$ 1250 or $MRR_2$ 1350. The write registers $MWR_1$ 1230 and $MWR_2$ 1330 are supplied with a selected one of the outputs of the pipeline multiplier 700 and the pipeline adder 1000 through selectors SEL 1240 and 1340, respectively. The address registers $MAR_1$ 1220 and $MAR_2$ 1320 may be formed of a counter. After an initial address is set therein by the ALU 1110, a new address can be set by changing the count of each address register. Either of the outputs of the adder 1000 and the multiplier 700 is selected by the selector 100 and is supplied to the FIFO 250 where it is written and read by the application of control signal WE and RE thereto. The output of the FIFO can be transferred through the gate $G_3$ and the bus $B_3$ or $B_4$ to the adder 1000.

Similarly, the REG 450 inputs either of the outputs of the adder 1000 and multiplier 700 selected by the SEL 300, and can output the stored data through the buses $B_1$ to $B_4$ of the gate $G_4$ to the multiplier 700 and the adder 1000.

The operations of the above component elements are controlled by a control unit CONTROL 2000. In the CONTROL 2000, the output of a micro-program memory 2500 is set in a microinstruction register MIR 2600 and supplied to each component element and to a selector SEL 2100. The output of the SEL 2100 is applied to a microinstruction address register MIAR 2200 and thus specifies addresses to the micro-program memory 2500. The output of the MIAR 2200 is applied to a counter 2800, the output of which is fed through the SEL 2100 to the MIAR 2200. The output of the MIR 2600 includes read/write signal, RE, WE, read/write pointer RP, WP, gate signal Gi etc. and synchronously controls each selector, FIFO 250, REG 450, gates $G_1$ to $G_4$, etc. in accordance with the microprogram.

Figure 5:
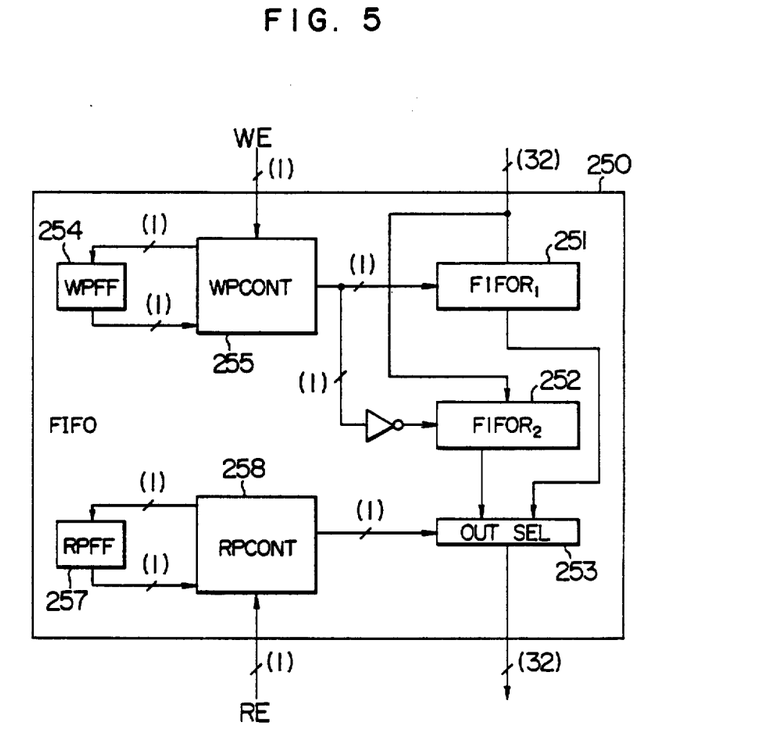
FIG. 5 is a block diagram of the FIFO buffer to be used in the processor of FIG. 4.

FIG. 5 shows an arrangement of the FIFO memory 250 for two words. When a write point specifying flip-flop WPFF 254 is turned off or on, a write point control circuit WPCONT 255 supplies a write signal to a register $FIFOR_1$ 251 or $FIFOR_2$ 252. Similarly, when a read point specifying flip-flop RPFF 257 is turned on or off, a read point control circuit RPCONT 258 controls an output selector 253 to read the contents of the register $FIFOR_2$ 252 or $FIFOR_1$ 251. Since the flip-flops WPFF 254 and RPFF 257 are reversed in their respective states each time the control circuits WPCONT 255 and RPCONT 258 perform one write and read operation, respectively, the circuit 250 operates as a two-word FIFO memory.

Figure 6:
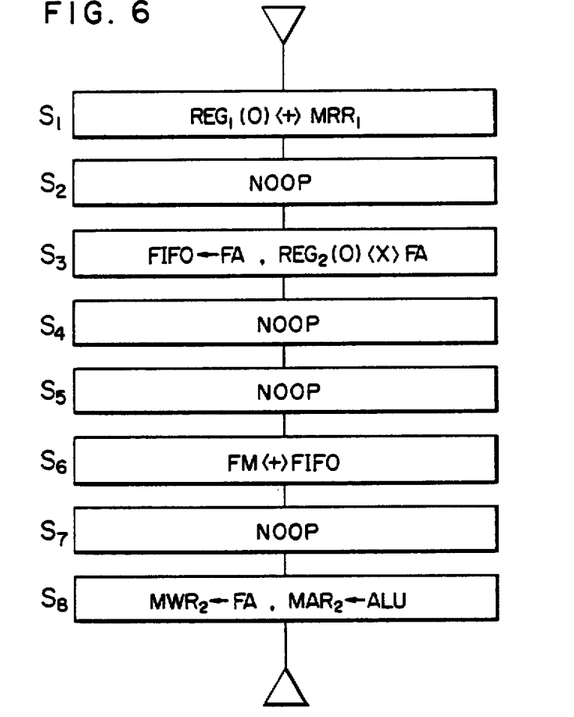
FIG. 6 is a flow chart of a microprogram for use in the embodiment of FIG. 4.

The operation of this embodiment will hereinafter be described with reference to the example of the program (1) set forth above. FIG. 6 is a flow chart of a microprogram written in RTL language, for calculation of $I=1$ in the loop program (1) to be executed in the embodiment of FIG. 4. In FIG. 6, $REG_1(0)$ and $REG_2(0)$ indicate contents in the register REG 450 at the specified addresses when read pointers $RP_1$ and $RP_2$ are 0, respectively, at which addresses constants C and A in the program (1) are stored before the start of calculation. Data X(1) is set in the read register $MRR_1$ 1250.

In FIG. 6, at step S1, $REG_1(0)=C$ and the contents X(1) of the $MRR_1$ 1250 are fed to the adder 1000, and added together through step S2 to provide an intermediate result $FA=F(1)$. At step S3, the intermediate result FA is fed through 32-bits output line 40 and selector 100 to the FIFO 250 in accordance with the instruction FIFO←FA. At the same time, in accordance with the instruction $REG_2(0)<x>FA$ the adder output FA is fed via gate $G_6$ to the multiplier 700 and constant A is read from the REG 450 by pointer $RP_2=0$ and fed to the multiplier 700, where multiplication starts. Since the multiplier has three stages, the multiplication is completed through steps S4 and S5. At step S6, instruction $FM<+>FIFO$ is executed such that the result of multiplication $FM=AF(1)$ is read via gate $G_5$ and fed to the adder 1000 and F(1) is read from FIFO 250 and fed to the adder 1000, where they are added to each other. After addition is completed through two stages at S6 and S7, the result of addition, $FA=Y(1)$ is set in $MWR_2$ 1330 via the selector 1340 in accordance with the instruction $MWR_2$←FA at step S8. At the same time, the instruction $MAR_2$←ALU is executed such that the address calculated at ALU 1110 is set in the $MAR_2$ 1320, and causes the result Y(1) set in the $MWR_2$ 1330 to be written in the memory $M_2$ 1310 at this address.

Figure 7:
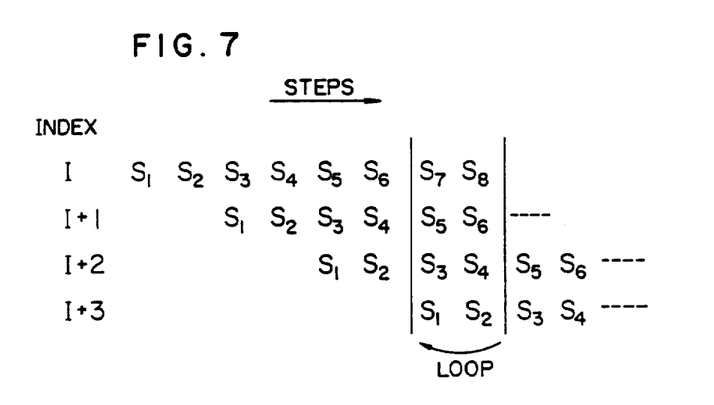
FIG. 7 is an explanatory diagram useful for explaining pipeline processing steps to be executed upon repetition of the program of FIG. 6 for each index in the system of FIG. 4.

Similar processing as described above will also be repeated for the successive indices $I=2, 3, 4, \ldots$ When such repetitive processings are pipelined, they will be shifted by two steps for each index, similar to the prior art, as shown in FIG. 7. The microprogram of loop construction for executing such pipelined operation can be a flow having a repetition loop of only two steps as shown in FIG. 8.

Figure 8:
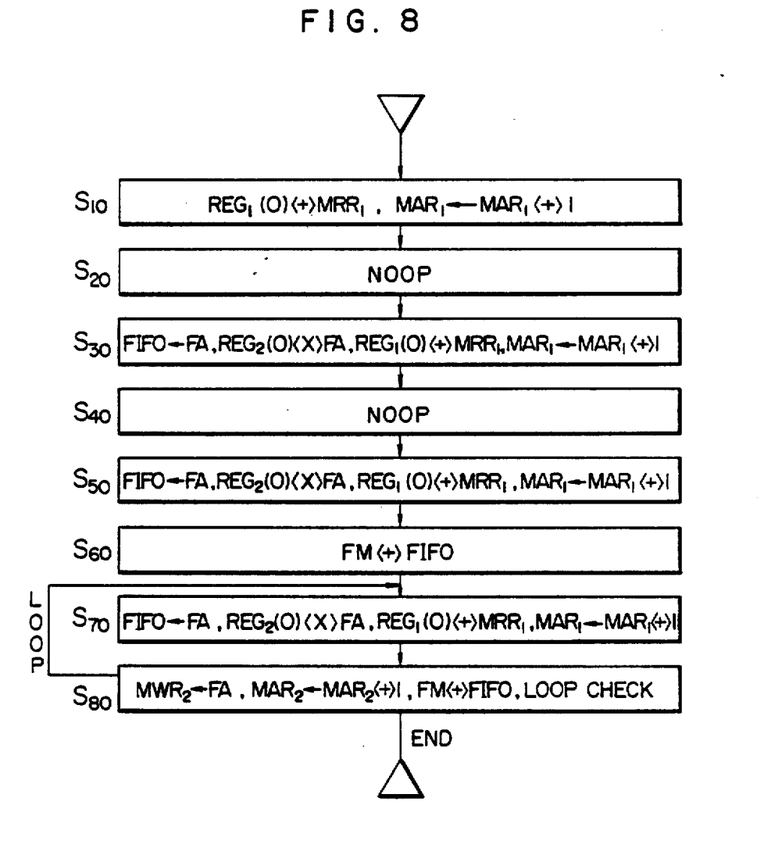
FIG. 8 is a flow chart of a microprogram for the pipeline processing operation of FIG. 7.

In FIG. 8, step S10 corresponds to step S1 in FIG. 6. Further, for the purpose of pipelined operation, the address register $MAR_1$ 1220 comprising a counter is incremented by one by the instruction $MAR_1$←$MAR_1<+>1$ to enable read-out of the next data X(2) from the memory 1210 in the addition instruction $REG_1(0)<+>MRR_1$ at a step S30. This also applies for the instruction $MAR_1$←$MAR_1<+>1$ at steps S30, S50 and S70. At step 80 instruction $MAR_2$←$MAR_2<+>1$ also increments the contents of the $MAR_2$ 1320 by one to renew the address in the memory $M_2$ 1310 for storing the operation result Y(I) when the process proceeds around the loop and goes back to the step S80. Thus, a value ([the address of Y(1)] − 1) is set in the $MAR_2$ 1320 as the initial value.

At step S30, instructions $REG_1(0)<+>MAR_1$ and $MAR_1$←$MAR_1<+>1$ execute the same operations as at step S10 for index $I=2$, and instructions FIFO←FA, $REG_2(0)<+>FA$ execute the operations corresponding to step S3 in FIG. 6 for data of $I=1$.

At step S50, the same operations as at step S30 are executed for the index further incremented by one. At this time, the FIFO 250 has stored values of F(1) and F(2) in turn by the instruction FIFO←FA at steps S30 and S50. There is no need for different instructions as $REGX(0)$←FA and $REGX(1)$←FA in the step S3 as in the conventional example of FIG. 2.

At step S60, the instruction $FM<+>FIFO$ initiates the addition of the result of multiplication $FM=A \cdot F(1)$ is for $I=1$ and the data F(1) supplied to the FIFO 250 at step S30. In this case, an FIFO memory of two or more words may be used as the FIFO 250.

Subsequently, the program enters into the loop and at step S70 the same operation as at step S50 is executed for a further incremented index. At step S80, the result of addition $FA=A \cdot F(1)+F(1)$ initiated at step S60 is set in the write register $MWR_2$ 1320 in accordance with the instruction $MWR_2$←FA, and the address for the memory 1310 is updated for the next $(I=2)$ storage by the instruction $MAR_2$←$MAR_2<+>1$, and the addition $AF(2)+F(2)$ as at step S60 for the case of $I=2$ is started by instruction $FM<+>FIFO$. The number of iterations N is set in advance in the register ALUREG 1120 within the address calculation unit ALU 1100. At step 70, the content of the ALUREG 1120 is reduced by one by the output of ALU 1110 (the instruction is omitted in FIG. 8). At step S80, whether N has reached 0 or not is examined by instruction LOOP CHECK. When 0 is reached, the program goes to END as its termination. When 0 is not reached yet, the program goes back to step S70, and repeats the loop.

Thus, the program (1) is executed by the abovementioned microinstructions. At step S70, the intermediate result of addition $FA=X(I)+C=F(I)$ for each index I is stored in the FIFO 250 as at steps S30 and S50 by the similar type of instruction FIFO←FA. At step S80, the first data inputted in the FIFO is automatically read as F(I) by the instruction $FM<+>FIFO$ and added to the result of addition $FM=AF(I)$ at that time by the instruction $FM<+>FIFO$. As compared with the conventional program for such an apparatus with no FIFO memory, in which the results for the successive indices are distinguishedly written in and read from REGX(0) and REGX(1), the above program is extremely simple. The loop can only be formed of two steps and programming can be made without considering the address of the register for storing the intermediate result.

The FORTRAN program (1) is extremely simple. In the actual example of arithmetic operations of functions, however, many operation units operate in parallel in the same machine cycle and the selector, buffer and so on as shown in FIG. 4 are also controlled in a complex manner. Therefore, repetitive processings usually include 10 to 30 steps. In this embodiment of the invention, the length of such repetitive portions is greatly reduced.

According to the results of practical microprogrammings for processing of mathematical functions, etc., it was found that the capacity of two words for the FIFO memory were sufficient for most of the cases.

The outputs of the memory units 1200 and 1300 and the register 450 are connected to the inputs of multiplier 700 and adder 1000 so that the left and right inputs to the multiplier 700 and adder 1000 can be combined arbitrarily.

The output of the FIFO buffer 250 may only be connected to the right and left inputs of the adder. In the example of function arithmetics and so on, sufficient effects can be obtained by supplying the FIFO output only to the adder. It will be apparent that this embodiment can be applied to various modifications and alterations including the above-described connection versions.

Thus, as compared with the conventional method in which the buffer register for the processor is accessed by addressing means, this embodiment can greatly reduce the number of steps in the looped operation for vector processing and facilitates the design of microprograms.

We claim:

1. A vector processor capable of processing components of a vector by repetitive operations, comprising:
   at least one pipeline operation unit, including at least two processing stages capable of synchronous operation, each processing stage having logic circuit means for performing a logic operation, and register means for holding an output of said processing stages;
   at least one first-in first-out (FIFO) memory connected to said pipeline operation units for temporarily storing sequentially generated intermediate operation-results of said arithmetic operations in the order such results are generated;
   bus means for transferring vector data from said pipeline operation unit to said FIFO memory and from said FIFO memory to said pipeline operation unit;
   control means for controlling said pipeline operation unit and said FIFO memory in synchronism under micro-instruction control, so that in one repetitive loop of a repetitive operation, one data element of one vector obtained in a pipeline operation unit at one machine cycle is written into said FIFO memory through said bus means, and data later machine cycle which occurs before or at the same time said one data element is read out of said FIFO memory, another data element of the same vector is written into said FIFO memory through said bus means; and
   a register file having at least one input port and at least two output ports, wherein said bus means includes a connection between said register file and said pipeline operation unit, said register file being capable of writing at least one data element and reading at least two data elements simultaneously in response to one microinstruction.

2. A vector processor according to claim 1, further including selector means connected to said one input port of said register file for selecting an input from a plurality of inputs.

3. A vector processor according to claim 2, wherein said bus means includes a connection between said multiplier and adder and said selector means.

4. A vector processor according to claim 3, wherein each of said at least two output ports of said register file is capable of supplying data to either one of said multiplier and said adder.

5. A vector processor according to claim 4, further comprising an arithmetic calculation unit capable of calculating an address for reading and writing data from and to said memory under the control of said microinstruction.

6. A vector processor capable of processing components of a vector by repetitive operations, comprising:
   at least one pipeline operation unit including at least two stages, each having logic circuit means for performing a logic operation and register means for holding an output of the logic circuit means;
   a memory operatively connected to said pipeline operation unit;
   a register file having at least one input port and at least two output ports, and being capable of simultaneously writing at least one data element and reading at least two data elements in response to independently designatable read and write addresses, so that when an operation result in said pipeline operation unit is written into an individually designated address of said register file, data can be read out of more than one individually designated address of the register file to said pipeline operation unit at the same time; and
   bus means for transferring data from said pipeline operation unit to said register file and from said register file to said pipeline operation unit.

7. A vector processor according to claim 6, wherein said operation unit includes at least one stage having a pipeline multiplier and at least one stage having a pipeline adder, said bus means being connected to transfer data between said multiplier and said adder.

8. A vector processor according to claim 6, further including selector means connected to said one input port of said register file for selecting an input from a plurality of inputs.

9. A vector processor according to claim 8, wherein said bus means includes a connection between said multiplier and adder and said selector means.

10. A vector processor according to claim 9, wherein each of said at least two output ports of said register file is capable of supplying data to either one of said multiplier and said adder.

* * * * *